Figure 1:
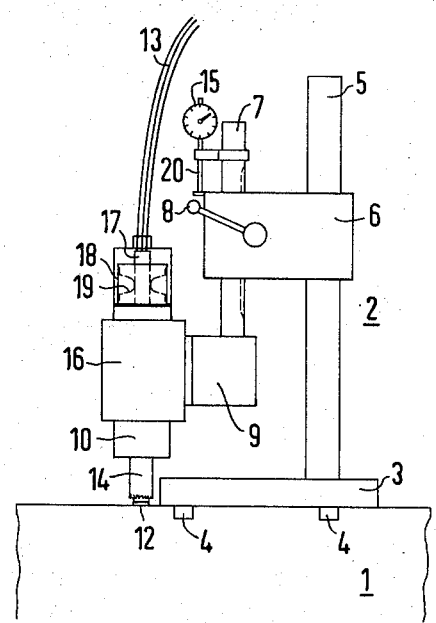

United States Patent [19]
Wolf et al.

[11] 3,803,905
[45] Apr. 16, 1974

[54] DEVICE FOR MACHINING AN ACCURATELY DIMENSIONED ANNULAR GROOVE AROUND A CIRCULAR MEASURING AREA FOR MEASURING INTRINSIC STRESSES IN STRUCTURAL COMPONENTS OF MACHINES AND APPARATUS

[76] Inventors: Helmut Wolf, Uhlenbroicher Weg 66, Duisburg-Grossenbaum; Wolfgang Böhm, Brucker Holt 32, Essen-Bredeney; Erwin Stücker, Neue Heimat 16, Essen-Frintrop, all of Germany

[22] Filed: Mar. 21, 1972

[21] Appl. No.: 236,721

[30] Foreign Application Priority Data
Aug. 25, 1971 Germany.......................... 2142463

[52] U.S. Cl.................................................. 73/88 R
[51] Int. Cl. ............................................ G01b 7/18
[58] Field of Search .................... 73/88, 95; 408/57

[56] References Cited
UNITED STATES PATENTS
3,163,190  12/1964  Ervin .................................... 90/57
3,068,688  12/1962  Gunnert................................. 73/88
2,028,154  1/1936   Mathar ................................... 73/88
3,071,963  1/1963   Gunnert.................................. 73/88

FOREIGN PATENTS OR APPLICATIONS
1,944   1871   Great Britain.......................... 90/57

Primary Examiner—Herbert Goldstein
Attorney, Agent, or Firm—Herbert L. Lerner

[57] ABSTRACT

There is included in apparatus for checking a structural component for intrinsic stresses by attaching strain gage means to a surface measuring area of the component, cutting an annular groove into the component around the area, measuring through terminal leads extending from the strain gage means the change in electrical response of the strain gage means, due to the cutting of successive layers of material out of the groove, as indicative of the intrinsic stress existing prior thereto, and measuring the depth of the layer of removed material or the corresponding depth of the groove after each incremental cut, a crown boring tool for machining the annular groove around the measuring area, the tool having a shaft hollow throughout and being mounted in a hollow boring spindle whereby the terminal leads of the strain gage means attached to the measuring area are extensible through the tool and the hollow spindle.

7 Claims, 3 Drawing Figures

DEVICE FOR MACHINING AN ACCURATELY DIMENSIONED ANNULAR GROOVE AROUND A CIRCULAR MEASURING AREA FOR MEASURING INTRINSIC STRESSES IN STRUCTURAL COMPONENTS OF MACHINES AND APPARATUS

The invention relates to device for machining an accurately dimensioned annular groove around a circular measuring area for measuring intrinsic stresses in structural components of machines and apparatus.

In application Ser. No. 130,724 filed Apr. 2, 1971, of which two of us are joint applicants, there is disclosed a method of measuring intrinsic stresses or tensions in rotors, discs, beams, vessels, housings, girders and like structural components which comprises the steps of attaching electric strain gage alements to a component on a surface area of small size relative to the total surface area thereof; cutting a groove around the area in a sequence of steps, each time removing a layer of material whereby the material of the thus resulting mesa region of the component expands analogously to intrinsic stresses present in that region prior to cutting the groove; after each incremental cut, measuring the depth ($dz$) of the layer of removed material or the corresponding groove depth ($z = \rho dz$), and also measuring, each time, by means of the strain gage elements, the resulting surface elongations $$\left[ d\epsilon_z = f\left(K_z, \frac{1}{E}, \sigma_z, dz\right), \epsilon_z = \sum_{z=0}^{z} d\epsilon_z \right]$$

of the mesa region, separately running a calibrating test with a specimen of calibrating material, using a measuring area geometry including groove configuration, strain elements and the arrangement thereof corresponding to the measuring area geometry of the component, the calibrating test comprising cutting a groove by layerwise removal of material and, each time, measuring the surface stresses ($d \epsilon^*, \epsilon z^* = \Sigma dz$) of the remaining specimen mesa region and the respectively corresponding cutting depth ($dz, =\epsilon dz$), and determining from the measured quantity the decay function $$K_z = f(\ E^*, 1/\sigma z^*, d\epsilon z dz)$$

and determining from the thus obtained quantities of elongation ($d\epsilon z$), depth ($dz$) and decay function ($Kz$), the intrinsic stress $\sigma z(z)$ of the component in accordance with the equation:

$$\sigma_z(z) = f(E, 1/K_z, d\epsilon z/dz\ )$$

wherein $\sigma$ is the median intrinsic stress, released at the groove depth $z$, of the particular layers $dz$, $\sigma^*$ is the intrinsic tension simulated in the calibrating test by external forces in the corresponding layer of specimen material, E is the modulus of elasticity of the material of the component, $E^*$ is the modulus of elasticity of the calibrating material, and $\sigma_z(z)$ is the intrinsic stress present at any locality along the depth coordinate z of the component.

To effect a dimensionally accurate machining of the circular groove, an apparatus is disclosed in the aforementioned copending application, which includes a bearing block placeable upon and attachable to the component in the region of the surface measuring area thereof; a setting sleeve mounted on the block and being adjustable in height above the measuring plane, the setting sleeve being removable from and reinsertable into the block when the block is arrested; and a cutting head rotatably mounted on the sleeve for rotation about an axis normal to the center of the strain gage elements, the cutting head being provided with a cutting tool in eccentric relation to the axis so that the cutting tool has a path for cutting the groove about the center of the measuring area.

When using such a cutting tool, it is necessary, however, that after each measurement and before each further cutting operation the terminal leads of the strain gage elements are detached because they would otherwise interfere with the cutting tool. This results in a considerable time loss for the individual measuring operations, since a considerable expense in both technical labor and time is required for securely resoldering the terminal leads each time.

It is accordingly an object of the invention to provide apparatus which will machine or mill the circular groove in a relatively simple manner without having to remove the terminal leads of the strain gage elements for each cutting operation.

With the foregoing and other objects in view, there is provided in accordance with the invention, in apparatus for checking a structural component for intrinsic stresses by attaching strain gage means to a surface measuring area of the component, cutting an annular groove into the component around the measuring area, measuring through terminal leads extending from the strain gage means the change in electrical response of the strain gage means, due to the cutting of successive layers of material out of the groove, as indicative of the intrinsic stress existing prior thereto, and measuring the depth of the layer of removed material or the corresponding depth of the groove after each incremental cut, a crown boring tool for machining the annular groove around the measuring area, the crown boring tool having a shaft hollow throughout and being mounted in a hollow boring spindle whereby the terminal leads of the strain gage means attached to the measuring area are extensible through the crown boring tool and the hollow boring spindle.

Accordingly, the terminal leads need be soldered only once to the strain gage means, so that after each increase in the depth of the groove the respective measurement can be effected immediately.

In accordance with another feature of the invention, there is provided a framework supportable on the component, the crown boring tool being downwardly displaceably mounted in the framework.

In accordance with yet another feature of the invention, the framework includes a base plate engageable with the component, a supporting column extending perpendicularly from the base plate, a traverse releasably secured to the supporting column, a toothed rack reciprocably mounted on the traverse, and a holder for the hollow boring spindle firmly connected to one end of the rack.

In accordance with a further feature of the invention, there are included a motor laterally flanged to the hollow spindle holder, and transmission means connected between the motor and the crown boring tool proper for driving the latter.

In order to measure the depth of the annular groove, in accordance with an added feature of the invention, a measuring device is coupled to the rack for measuring the displacement thereof.

In order to prevent the terminal leads from turning with the rotary crown boring tool or the borings from short-circuiting the measuring area, there is also provided in accordance with the invention, a protective tube extending through the hollow boring spindle and the hollow shaft of the crown boring tool and held against rotation with the spindle and the tool.

In accordance with still another feature of the invention, there is provided a cap extending over an end of the protective tube and secured to the boring spindle holder, the cap having clamping springs therewithin holding the protective tube and pressing it against the outer edge of the measuring area.

Other features which are considered as characteristic for the invention are set forth in the appended claims.

Although the invention is illustrated and described herein as embodied in device for machining an accurately dimensioned annular groove around a circular measuring area for measuring intrinsic stresses in structural components of machines and apparatus, it is nevertheless not intended to be limited to the details shown, since various modifications and structural changes may be made therein without departing from the spirit of the invention and within the scope and range of equivalents of the claims.

Figure 2:
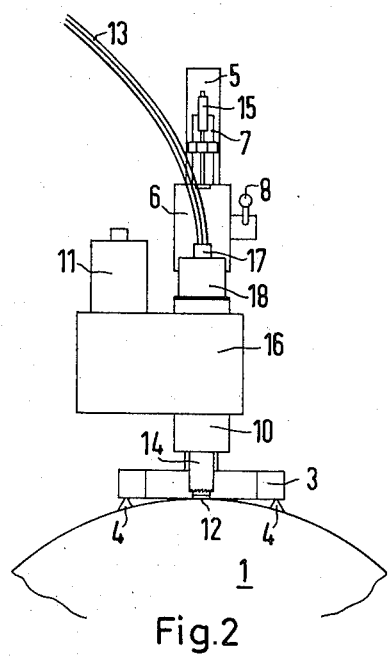
Figure 3:
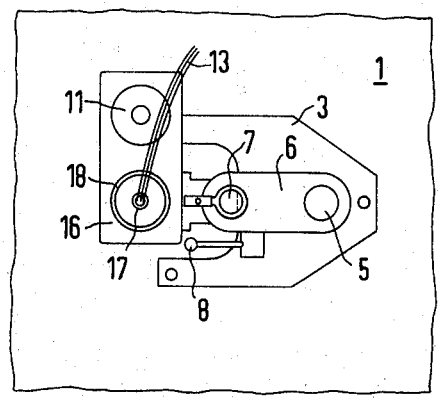

The construction and method of operation of the invention, however, together with additional objects and advantages thereof will be best understood from the following description of specific embodiments when read in connection with the accompanying drawings, in which:

FIGS. 1, 2 and 3 are respective side elevational, front elevational and plan views of the apparatus for checking a structural component for intrinsic stresses according to the invention.

Referring now to the figures of the drawings, there is shown therein a component 1 that is to be checked for intrinsic stresses which, for example in the illustrated embodiment is the rotor of a turbine. The checking apparatus 2 of the invention is placed upon the upper side of the rotor and held fast thereat. The apparatus 2 per se is made up of a base plate 3 which is firmly held by pivotable magnetic feet 4 on the component 1. The base plate 3 may, of course, also be secured to the component by nonillustrated tensioning bands as in the aforementioned copending application or by any other suitable means. A supporting column 5 extends perpendicularly and vertically from the base plate 3, and a traverse 6 is releasably secured to the supporting column 5 at a given elevation. The forward end of the traverse 6 carries a toothed rack 7 which is reciproable through a suitable nonillustrated gear mounted in the traverse 6 and turnable by a manually actuable lever 8. A transverse carrier 9 is secured to the bottom end of the rack 7, and a crown boring tool 14 mounted in a bore spindle 10 which is carried by a spindle holder 16 are, in turn, secured to the transverse carrier 9. The crown boring tool 14 is driven by a laterally flanged motor 11 through a transmission located in the spindle holder 16.

The operation of the apparatus of the invention is as follows:

Initially, the base plate 3 with the supporting column 5 is firmly mounted on the component 1 that is to be checked. Thereafter, the measuring area 12 is prepared by mounting respective strain gage strips thereon, and soldering terminal leads 13 to the strain gage strips. After the measuring area 12 has thus been prepared, the traverse 6 with the rack 7 and the crown boring tool 14 proper together with the drive motor 11 therefor are secured to the supporting column 5.

In order to prevent the terminal leads 13 from turning with the rotary crown boring tool 14 or borings from forming a short-circuit at the measuring area 12, a protective tube 17 is inserted through the hollow spindle 10 and the hollow shaft of the crown boring tool 14 so that it extends down to the measuring area 12, in order to receive the terminal leads 13 therewithin. A cap 18 is then slipped over the upper end of the protective tube 17. The cap 18 is fixed to the spindle holder 16 and is provided therewithin with springs 19 which hold the protective tube 17 against rotating with the tool 14 and the spindle 10. After the motor 11 is switched on, by lowering the rack 7 through the lever 8, the crown boring tool 14 can then cut an annular groove of corresponding depth in the component 1. By lowering the boring tool 14, the protective tube 17, through the springs 19, is pressed against the outer margin or edge of the measuring area 12 so that the area 12 is safely protected from borings. The depth of the cut annular groove can accordingly be read from a suitable meter 15 which is secured to the rack 7 and engages the stationary traverse 6 by means of a conventional sensing member or feeler 20. When a predetermined depth of the annular groove is attained, the crown boring tool 14 can be rendered inoperative so that directly thereafter, the respective expansions or elongations at the measuring area mesa 12, which has remained stationary, can be determined.

By employing such a crown boring tool 14 with a hollow shaft and by passing the terminal leads 13 through the hollow borer 14 as well as the hollow bore spindle 10, a very rapid and trouble-free means of measuring the expansions or elongations has been made possible. Furthermore, due to this novel construction according to the invention, the same conditions are always present because the terminal leads 13 do not have to be repeatedly resoldered after each boring operation.

Only one possible way of arranging and mounting the crown boring tool 14 of the invention is shown in the figures of the drawing. It is, of course, contemplated that the man of skill in the art can provide others which will be within the scope and employ the principles of the invention.

We claim:

1. In apparatus for checking a structural component for intrinsic stresses which apparatus includes strain gage means for attachment to a surface measuring area of the component, said strain gage means having terminals for leads, means for cutting an annular groove into the component around the area, electrical response measuring means remote from the area, and leads extending from the terminals of the strain gage means to the electrical response measuring means for measuring the change in electrical response of the strain gage means due to the cutting of successive layers of material out of the groove, as indicative of the intrinsic stress existing prior thereto, the improvement in which the cutting means comprises a crown boring tool for machining the annular groove around the measuring area, said crown boring tool having a shaft hollow throughout and being mounted in a hollow boring spindle, and the terminal leads of the strain gage means attached to the measuring area extend through said crown boring tool and said hollow boring spindle.

2. In apparatus according to claim 1, the improvement including a framework supportable on the component, said crown boring tool being downwardly displaceably mounted in said framework.

3. In apparatus according to claim 2, the improvement in which said framework includes a base plate engageable with the component, a supporting column extending perpendicularly from said base plate, a traverse releasably secured to said supporting column, a toothed rack reciprocably mounted on said traverse, and a holder for said hollow boring spindle firmly connected to one end of said rack.

4. In apparatus according to claim 3, the improvement including a motor laterally flanged to said hollow spindle holder, and transmission means connected between said motor and said crown boring tool for driving the latter.

5. In apparatus according to claim 3, the improvement including a measuring device coupled to said rack for measuring the displacement thereof.

6. In apparatus according to claim 3, the improvement including a protective tube extending through said hollow boring spindle and said hollow shaft of said crown boring tool, said protective tube being held against rotation with said spindle and said tool.

7. In apparatus according to claim 6, the improvement including a cap extending over an end of said protective tube and secured to said boring spindle holder, said cap having clamping springs therewithin holding said protective tube and pressing it against the outer edge of the measuring area.

* * * * *